(12) United States Patent
Kang et al.

(10) Patent No.: US 8,312,482 B2
(45) Date of Patent: Nov. 13, 2012

(54) AUTOMATION DISK FEEDING DEVICE

(75) Inventors: Ho-Cheng Kang, ShinJuang (TW);
Sung-Hsuan Wang, ShinJuang (TW)

(73) Assignee: Bluhen Tech Enterprise Ltd. (TW)

( * ) Notice: Subject to any disclaimer, the term of this patent is extended or adjusted under 35 U.S.C. 154(b) by 87 days.

(21) Appl. No.: 13/039,889

(22) Filed: Mar. 3, 2011

(65) Prior Publication Data
US 2012/0224463 A1 Sep. 6, 2012

(51) Int. Cl.
*G11B 7/085* (2006.01)
(52) U.S. Cl. .................................................. 720/619
(58) Field of Classification Search .............. 369/30.52
See application file for complete search history.

(56) References Cited

U.S. PATENT DOCUMENTS

| | | | | |
|---|---|---|---|---|
| 5,253,218 A | * | 10/1993 | Suzuki | 369/30.9 |
| 5,748,596 A | * | 5/1998 | Nakamichi | 369/30.9 |
| 5,883,876 A | * | 3/1999 | Nakamichi | 369/30.22 |
| 6,147,960 A | * | 11/2000 | Wolfer et al. | 369/30.52 |
| 7,150,790 B2 | * | 12/2006 | Russ | 118/324 |
| 7,596,059 B2 | * | 9/2009 | Koseki | 369/30.85 |

* cited by examiner

*Primary Examiner* — Mark Blouin (57) ABSTRACT

The present invention relates to an improved automation disk feeding device, comprising: a base, a pushing member, two disk feeding members, and a cover, wherein the base has a operation space, a supporting member and a disk exporting hole. In the present invention, a driving device is used to drive the pushing member to slide forward and backward on the operation space, such that a disk stored in a disk storing district of the cover is able to be exported via the disk exporting hole; Moreover, the disk feeding members are not formed integrally with the base but capable of being assembling to and disassembling from the base, so that, the applications of the improved automation disk feeding device can be increased by way of changing the disk feeding members with different shaped slide ways.

11 Claims, 14 Drawing Sheets

AUTOMATION DISK FEEDING DEVICE

BACKGROUND OF THE INVENTION

1. Technical Field

The present invention relates to an automation disk feeding device, and more particularly, to an improved automation disk feeding device capable of quickly and repeatedly feeding disk, and may not fail in the disk feeding process.

2. Description of Related Art

Generally, automation disk burning system includes an automation disk feeding device. When a disk tray withdraws from an optical disk device, the automation disk feeding device is able to automatically feed one disk stored in an unprocessed disk storing district into the disk tray; and then, the optical disk starts to execute the disk-burning process after the disk tray with the disk returns into the optical disk.

Figure 1:
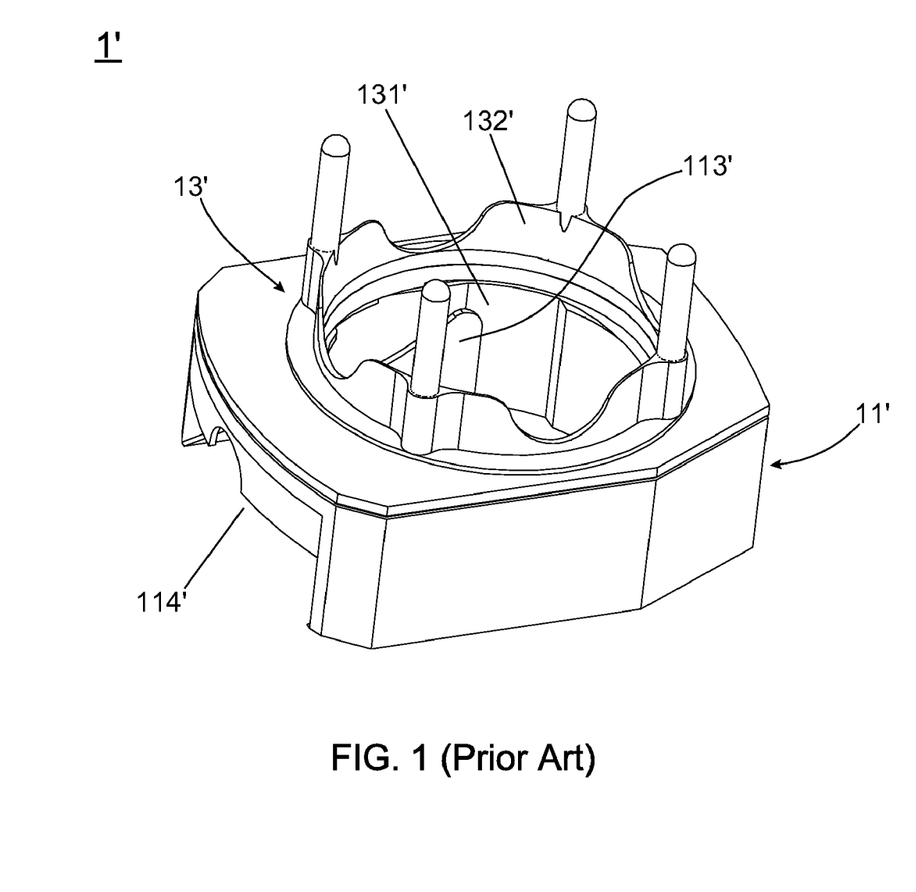
FIG. 1 a stereo view of a disk feeding device according to a R.O.C. patent with publication number of 200931403.
Figure 2:
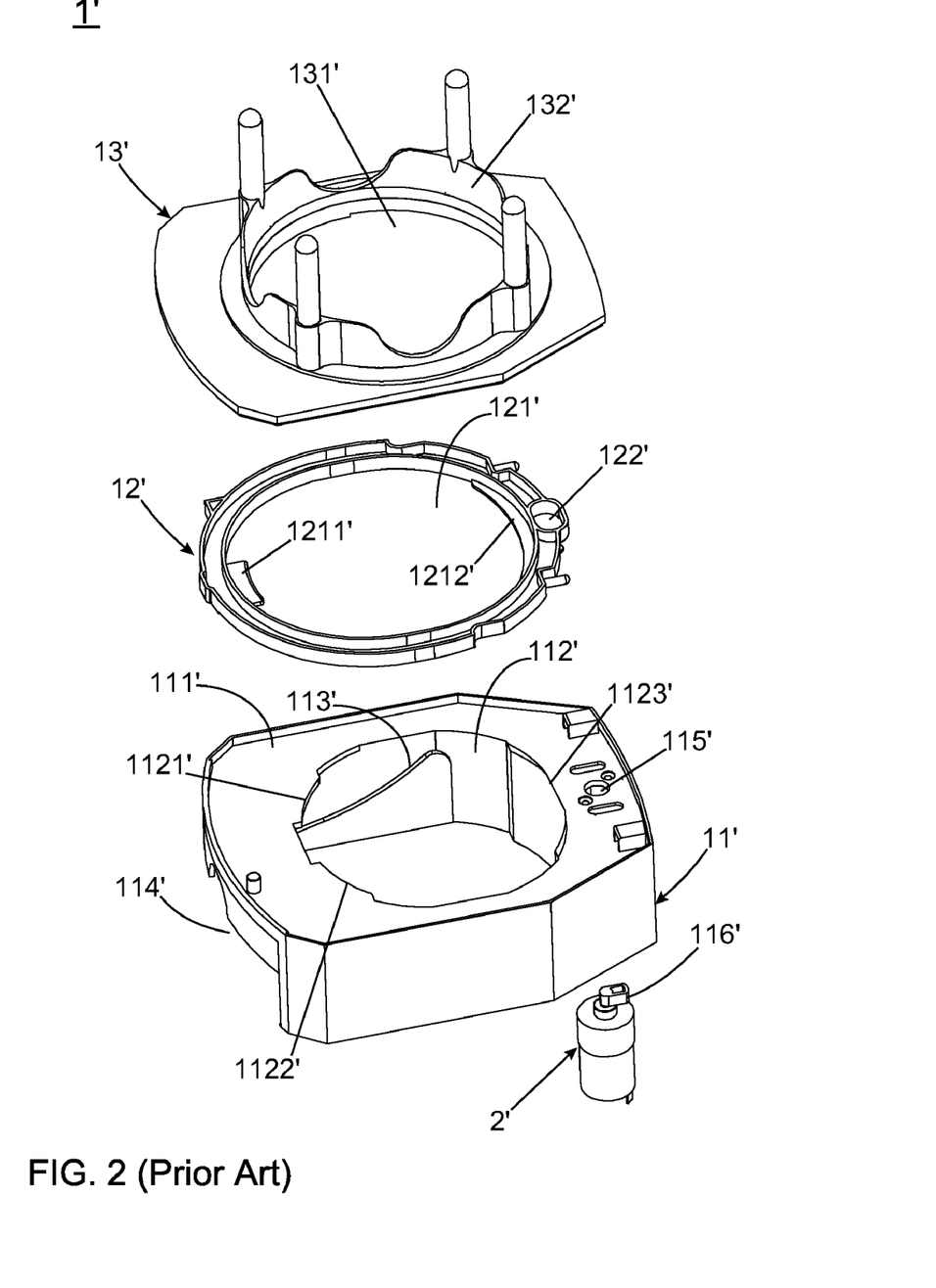
FIG. 2 is an exploded view of the disk feeding device according to the R.O.C. patent with publication number of 200931403.

Please refer to FIG. 1 and FIG. 2, which respectively illustrate a stereo view and an exploded view of a disk feeding device according to a R.O.C. patent with publication number of 200931403. As shown in FIG. 1 and FIG. 2, the disk feeding device 1' includes: a base 11', a pusher 12' and a cover 13'.

An operation space 111' is formed on the surface of the base 11', and the operation space 111' has a first opening 112' in the center thereof. The first opening 112' further includes a first protruding portion 1121', a second protruding portion 1122' and a third protruding portion 1123', wherein the three protruding portions are formed at three top points of the first opening 112', respectively. Moreover, two opposite slant feeding members 113' are disposed on the internal side-wall of the base 11', and are positioned below the operation space 111'. In addition, a feeding opening 114' is formed in one side of the base 11' and located at an ending end of the two slant feeding members 113'.

The pusher 12' is disposed and capable of sliding on the operation space 111'. As shown in FIG. 2, the pusher 12' is an annular means and has a second opening 121' in the center thereof, and the second opening 121' is opposite to the first opening 112'. Besides, two opposite pushing portions are formed in the second opening 121', which are, a first pushing portion 1211' and a second pushing portion 1212', respectively; moreover, the pusher 12' further has an eccentric opening 122'. One third opening 131' is formed on the surface of the cover 13', and around the edge of the third opening 131' is formed an annular flange 132', so as to formed a disk storing district.

In the conventional disk feeding device 1', one eccentric member installing hole 115' is formed on one side of the surface of the base 11' and opposite to the feeding opening 114', the eccentric member installing hole 115' is used for installing an eccentric member 116'; moreover, when the pusher 12' is disposed on the operation space 111', the eccentric opening 122' encloses the eccentric member 116'. The eccentric member 116' is connected to a motor device 2', so that the eccentric member 116' is drove to rotate when the motor device 2' operates.

Figure 3A:
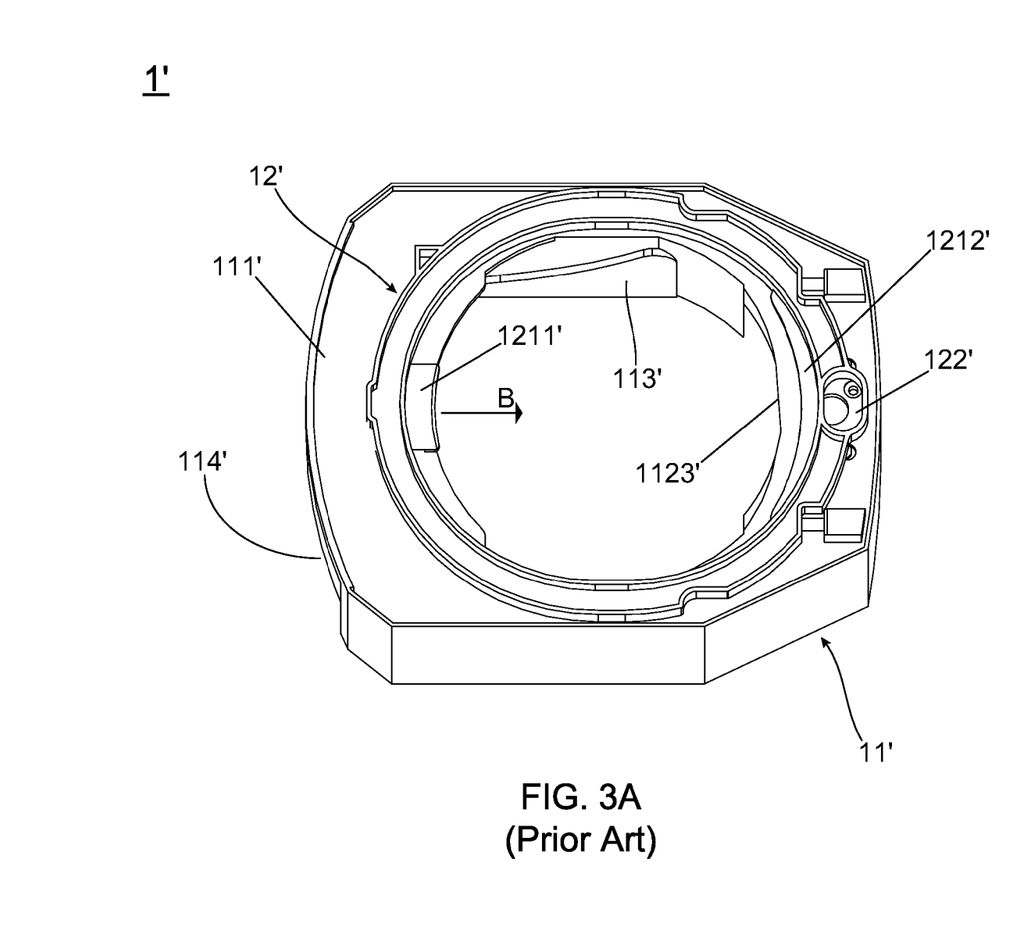
Figure 3B:
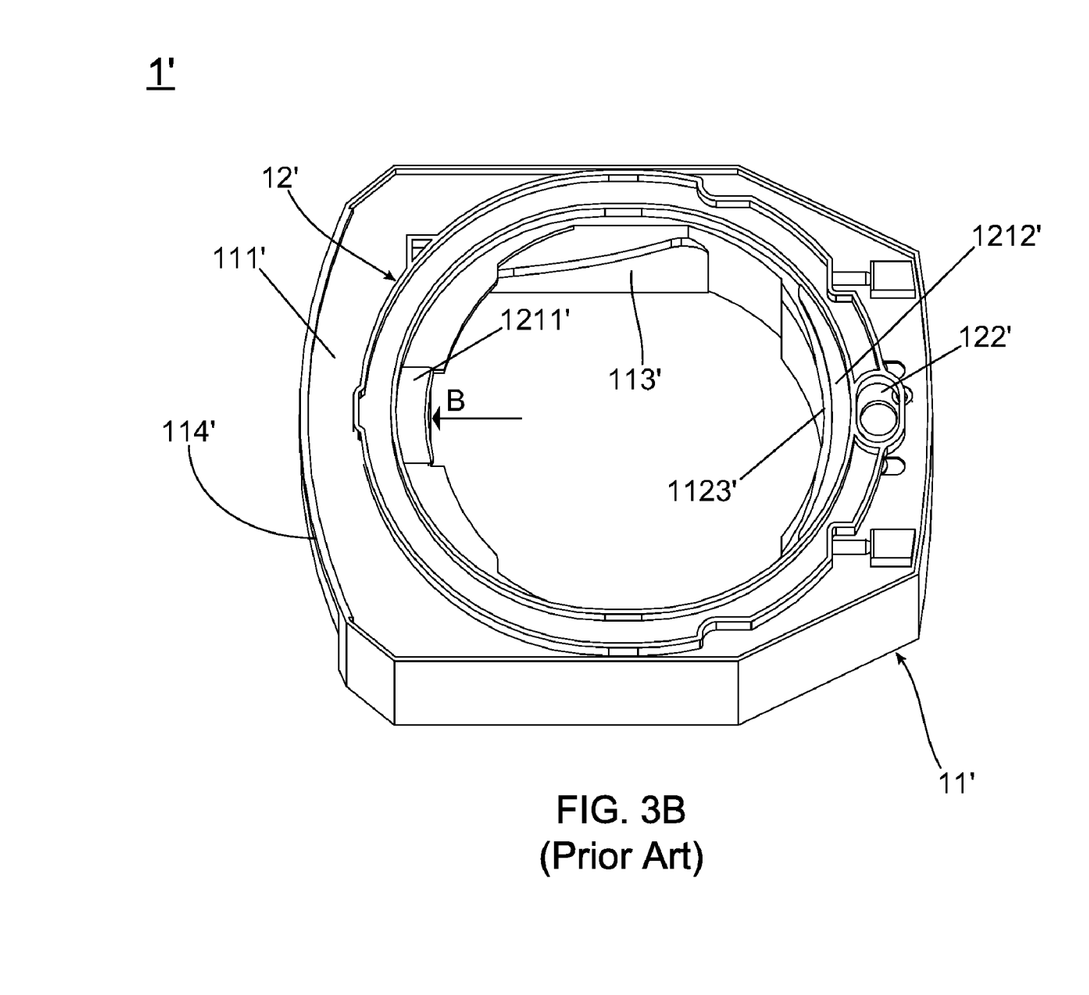

Continuously referring to FIG. 2, after a plurality of disks are put into the disk storing district, the disks are supported and held by the second pushing portion 1212', the first protruding portion 1121' and the second protruding portion 1122'. Referring to FIG. 3A and FIG. 3B, which illustrate a schematic motion diagram of the pusher sliding on the base. As shown in FIG. 3A, when the motor device 2' operates and drives the eccentric member 116' to rotate (the eccentric member 116' and the motor device 2' are not shown in FIG. 3A and FIG. 3B), the pusher 12' moves toward an arrow B and the first pushing portion 1211' pushes one end of the disk. So that, after the motor device 2' and the eccentric member 116' completing a half-cycle rotation, the third protruding portion 1123' of the first opening 11' is exposed out of the second pushing portion 1212', so as to constitute a clipping groove with the bottom of the cover 13', such that the another end of the disk is embedded into the clipping groove and clipped by the clipping groove; meanwhile, the disk quits the support of the first protruding portion 1121' and the second protruding portion 1122' and presents a tilt state.

As shown in FIG. 3B, when the motor device 2' continuously operates and drives the eccentric member 116' to finish a full-cycle rotation; in the meantime, the pusher 12' moves toward the arrow B and the second pushing 1212' pushes the disk, so as to make the disk quit from the clipping groove and fall onto the two slant feeding members 113'; furthermore, the disk slides along the slant feeding members 113' to the feeding opening 114'.

Thus, according to the above description, it is easily to know that the disk feeding device 1' is a means with simple mechanical design. The disk feeding device 1' can not only be equipped to an automation disk burning system, but can also be a disk storing device by way of changing the shape of the slant feeding member 113'. However, the disk feeding device 1' still includes shortcomings and drawbacks as follows:

1. The width of the clipping groove is around 1.5 mm; however, the thicknesses of the commercial available disks are not the same, and the disks with the thicker thickness can not be completely embedded into the clipping groove; for this reason, when the disk feeding device executes the disk feeding process quickly and repeatedly, the disk feeding process may be stopped and fail due to the disk can not be completely embedded into the clipping groove, so as to affect the stability of the disk feeding device 1'.
2. The two slant feeding members 113' and the base 11' are integrally formed, so that, the shape of the slant feeding member 113' is set after the base 11' is made, and the speed of the disk sliding on the slant feeding members 113' is limited. In the above description, it also implicates that the application of the disk feeding device 1' is decided (i.e., the disk feeding device 1' is decided to be a disk feeding device equipped to the automation disk burning system, or purely be a disk storing device).
3. The disk feeding device 1' not includes a disk counting device, thus, when using the disk feeding device 1', it must count the numbers of the disk exported via the feeding opening 114' by way of manpower; that is very inconvenient.

Accordingly, in view of the disk feeding device still has shortcomings and drawbacks, the inventor of the present application has made great efforts to make inventive research thereon and eventually provided an improved automation disk feeding device.

BRIEF SUMMARY OF THE INVENTION

The primary objective of the present invention is to provide an improved automation disk feeding device, adopted for solving the issue about the disk feeding process may be stopped and fail due to the disk can not be completely embedded into the clipping groove in the conventional disk feeding device, so as to increase the stability of the disk feeding device.

The another objective of the present invention is to provide an improved automation disk feeding device, in which, two disk feeding members can be assembled on the internal side-walls of the base, so that, the identical disk feeding device may has different applications by way of changing the disk feeding members with different shapes.

Accordingly, to achieve the abovementioned primary objective, the inventor proposes an improved automation disk feeding device, comprising: a base, a pushing member, two disk feeding members, and a cover, wherein the base comprises: an operation space, a first opening, a rolling member, a supporting member, and a disk feeding opening.

The first opening is formed on the surface of the operation space, and has a first protruding portion, a second protruding portion, a first indentation portion, and a second indentation portion, wherein the first protruding portion, the first indentation portion and the second protruding portion are connected with each other, and the second indentation portion is opposite to the first protruding portion, the first indentation portion and the second protruding portion. The rolling member is disposed in the second indentation portion, the supporting member is opposite to the first indentation portion and disposed on a first internal side-wall of the base, and the disk feeding opening is opposite to the first internal side-wall and formed on one side of the base.

The pushing member is disposed on the operation space and capable of sliding on the operation space, which comprises: a second opening, opposite to the first opening; a first pushing portion, formed in a first edge of the second opening; and a second pushing, opposite to the first pushing portion and formed on a second edge of the second opening. The two disk feeding members are disposed on a second internal side-wall and a third internal side-wall of the base, respectively. Wherein the second internal side-wall is opposite to the third internal side-wall, and both the second internal side-wall and the third internal side-wall are adjacent to the first internal side-wall; moreover, each of the disk feeding members has a sliding way formed on the top surface thereof, and an ending end of the sliding way locates at the disk feeding opening.

The cover is secured on the base by way of covering the pushing, and has a third opening in the center thereof, wherein an annular flange is disposed around the third opening, in addition, the third opening and the annular flange constitute of a disk storing district.

wherein a driving device is disposed in the interior of the base and used for driving the pushing member to slide on the operation space; moreover, when the driving device completes a half-cycle rotation, the pushing member slides toward the disk feeding opening, so that the rolling member and the second indentation portion are exposed out of the second pushing portion, meanwhile, a clipping groove is formed between the second indentation portion and the bottom of the cover, and one end of a disk in the disk storing district is embedded into the clipping groove due to the pushing of the first pushing portion and the rolling of the rolling member, in addition, the another end of the disk falls on the supporting member disposed on the first internal side-wall; furthermore, when the driving device operates continuously and finishes a full-cycle rotation, the pushing member slides toward the first indentation portion and pushes the disk, such that the disk quits the clipping groove and falls onto the two disk feeding members, and then the disk slides along the sliding ways of the disk feeding members to the disk feeding opening.

BRIEF DESCRIPTION OF THE SEVERAL VIEWS OF THE DRAWINGS

The invention as well as a preferred mode of use and advantages thereof will be best understood by referring to the following detailed description of an illustrative embodiment in conjunction with the accompanying drawings, wherein:

FIG. 3 A and FIG. 3B are a schematic motion diagram of a pusher sliding on a base according to the R.O.C. patent with publication number of 200931403;

DETAILED DESCRIPTION OF THE INVENTION

To more clearly describe an improved automation disk feeding device according to the present invention, embodiments of the present invention will be described in detail with reference to the attached drawings hereinafter.

Figure 4:
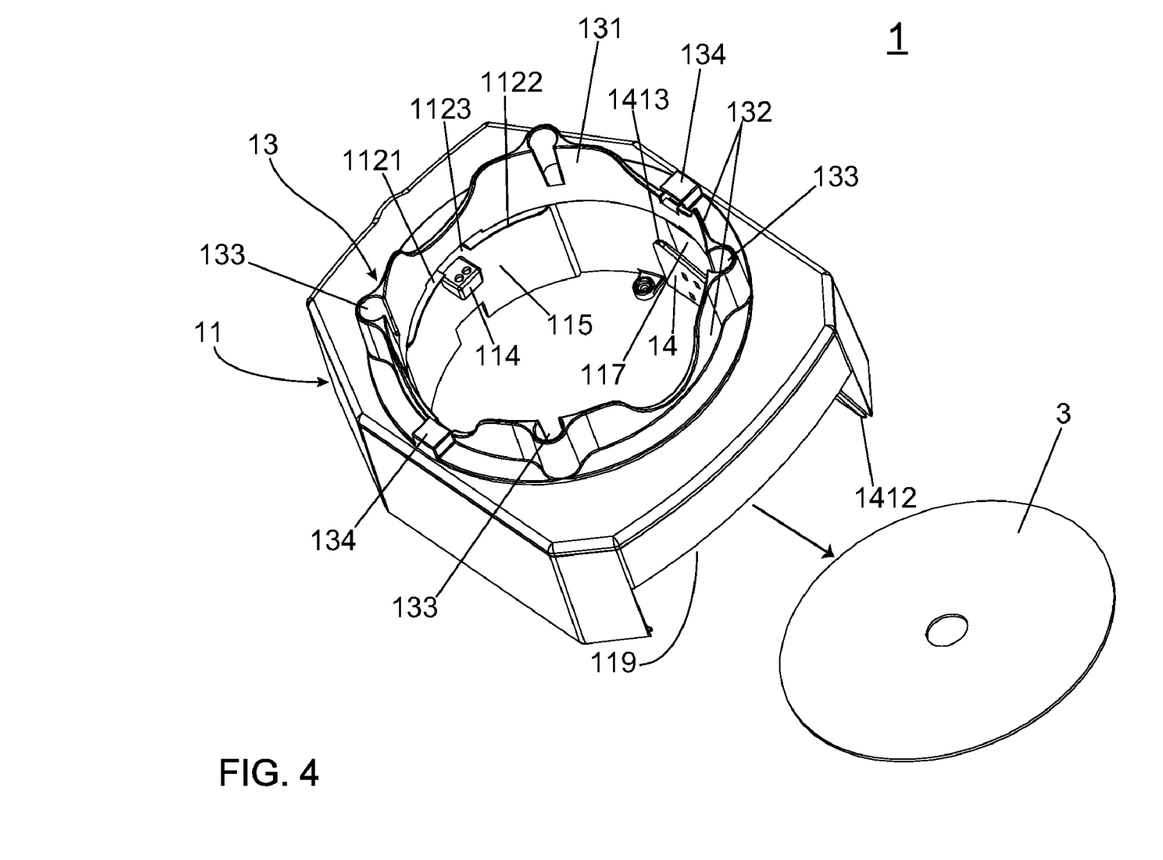
FIG. 4 is the stereo view of an improved automation disk feeding device according to the present invention.
Figure 5:
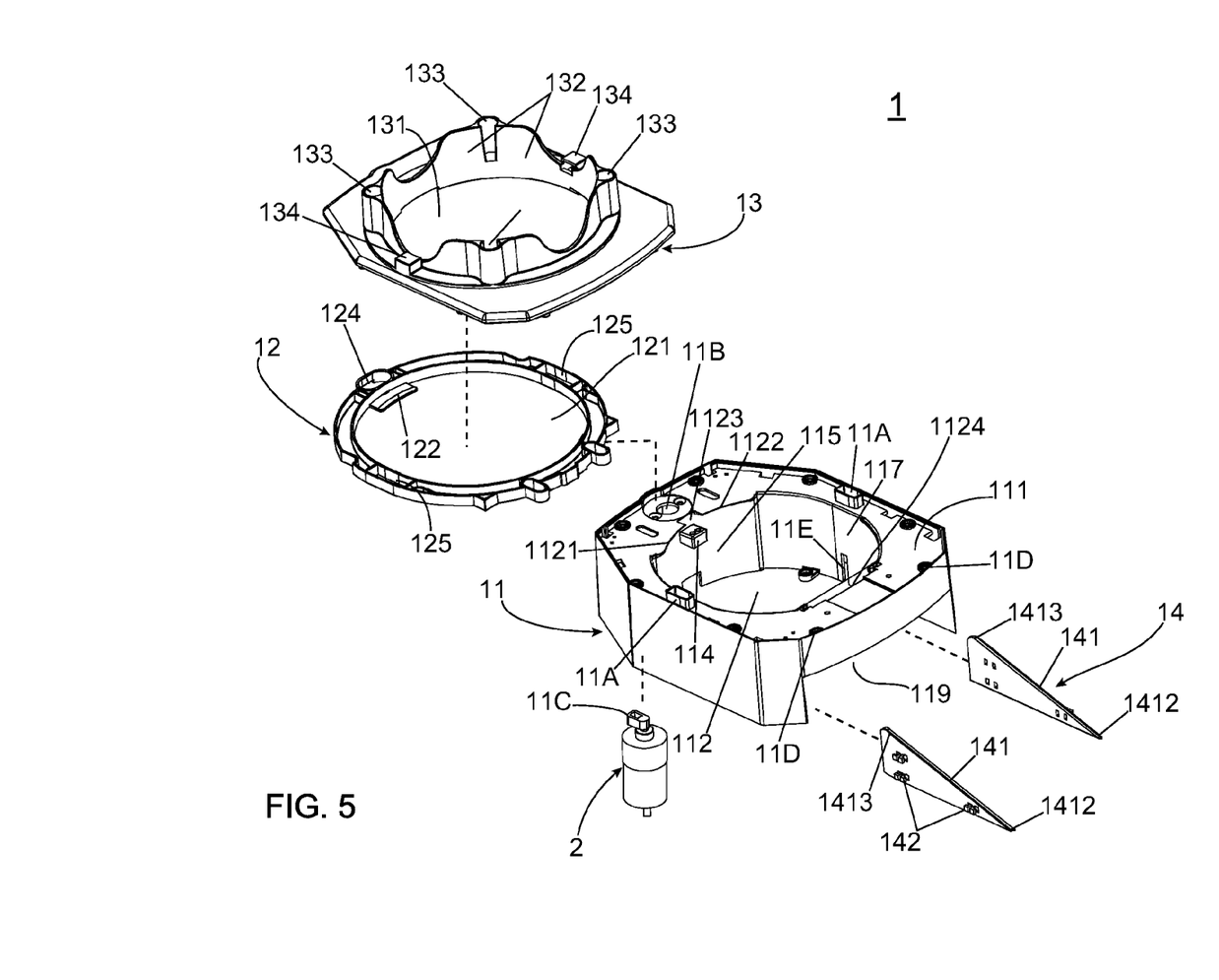
FIG. 5 is the exploded view of the improved automation disk feeding device according to the present invention.

Please refer to FIG. 4 and FIG. 5, which illustrate a stereo view and exploded view of the improved automation disk feeding device according to the present invention. As shown in FIG. 4, and FIG. 5, an improved automation disk feeding device 1, including: a base 11, a pushing member 12, two disk feeding members 14, a cover 13, and an eccentric member 11C, wherein the base 11 includes: an operation space 111, a first opening 112, a rolling member 113, a supporting member 114, a disk feeding opening 119, two positioning blocks 11A, an eccentric member installing hole 11B, a plurality of threaded holes 11D, and two assembling slots 11E.

Figure 6:
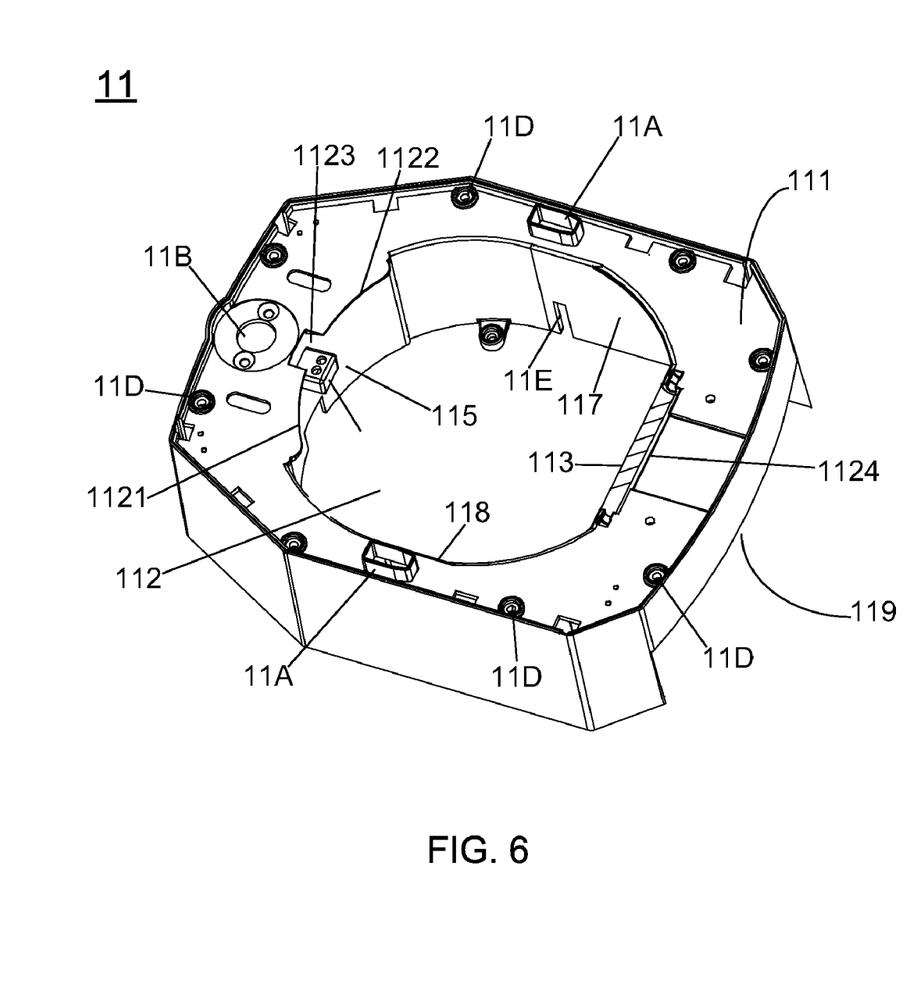
FIG. 6 is the stereo view of a base of the improved automation disk feeding device according to the present invention.

Continuously referring to FIG. 4, and FIG. 5, and simultaneously referring to FIG. 6, which illustrate the stereo view of the base of the improved automation disk feeding device according to the present invention. The first opening 112 is formed on the surface of the operation space 111 in the base 11; besides, a first protruding portion 1121, a second protruding portion 1122, a first indentation portion 1123, and a second indentation portion 1124 are formed on the edge of the first opening 112, wherein the first protruding portion 1121, the first indentation portion 1123 and the second protruding portion 1122 are connected with each other, and the second indentation portion 1124 is opposite to the first protruding portion 1121, the first indentation portion 1123 and the second protruding portion 1122. The rolling member 113 is disposed in the second indentation portion, the supporting member is opposite to the first indentation portion 1123 and disposed on a first internal side-wall 115 of the base 11, and the disk feeding opening 119 is opposite to the first internal side-wall 115 and formed on one side of the base 11.

In the base 11, the two positioning blocks 11A are oppositely disposed on the operation space 111. The eccentric member installing hole 11B is formed on the operation space 111 and adjacent to the first indentation portion 1123. The plurality of threaded holes 11D are disposed around the edge of the operation space 111 and adopted for securing the cover 13 and the base 11. The two assembling slots 11E are disposed on a second internal side-wall 117 and a third internal side-wall 118, respectively, and used for assembling the two disk feeding members 14. In addition, as shown in FIG. 5, the eccentric member 11C is disposed in the interior of the base 11 by way of installing on and passing through the eccentric member installing hole 11B, so as to connect with a driving device 2 disposed within the base 11.

Figure 7:
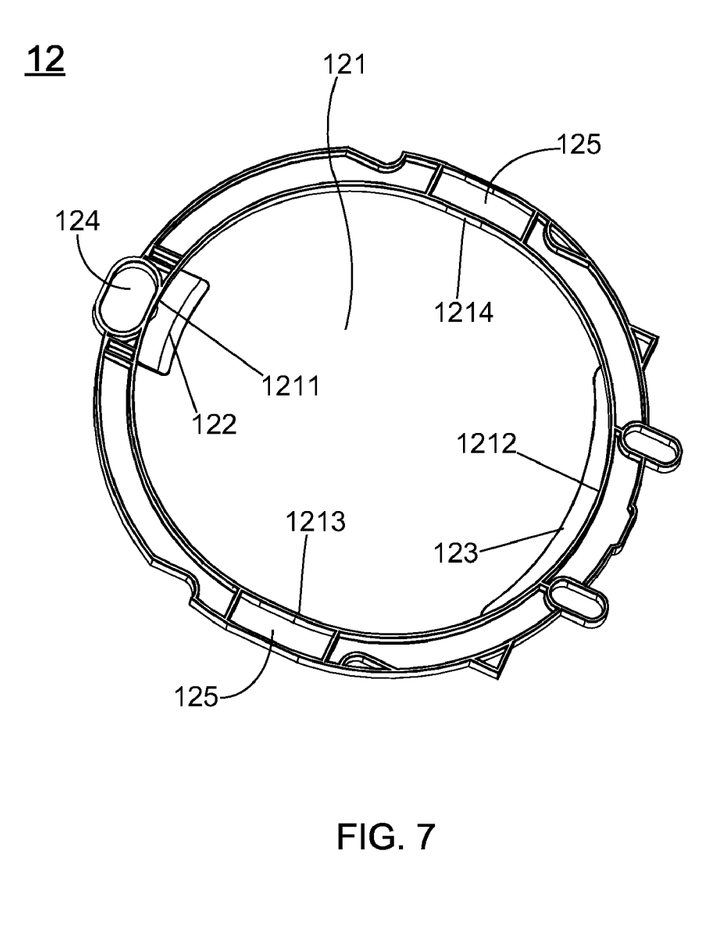
FIG. 7 is the stereo view of a pushing member of the improved automation disk feeding device according to the present invention.

Referring to FIG. 5 again, and simultaneously referring to FIG. 7, which illustrates the stereo view of the pushing member of the improved automation disk feeding device. In the improved automation disk feeding device 1, the pushing member 12 is disposed on the operation space 111 and capable of sliding on the operation space 111, the pushing member 12 includes: a second opening 121, a first pushing portion 122, a second pushing 123, an eccentric hole 124, and two long positioning holes 125; wherein the second opening 121 is opposite to the first opening 112 when the pushing member 12 is disposed on the operation space.

Moreover, as shown in FIG. 7, the first pushing portion 122 is formed in a first edge 1211 of the second opening 121, and the second pushing 123 is opposite to the first pushing portion 122 and formed on a second edge 1212 of the second opening 121. The eccentric hole 124 is formed on the first edge 1211 of the second hole 121 and adjacent to the first pushing portion 122, wherein the eccentric hole 124 allows the eccentric member 11C to pass through when the pushing member 12 is disposed on the operation space 111. The two long positioning holes 125 are oppositely formed on a third edge 1213 and a fourth edge 1214 of the second hole 121, respectively, and used for cooperating with the two positioning blocks 11A; Therefore, when the pushing member 12 slides on the operation space 111, by way of the cooperation of the two long positioning holes 125 and the two positioning blocks 11A, not only the pushing member 12 is able to steadily slide on the operation space 111, but also the slide distance of the pushing member 12 is confined.

Figure 8:
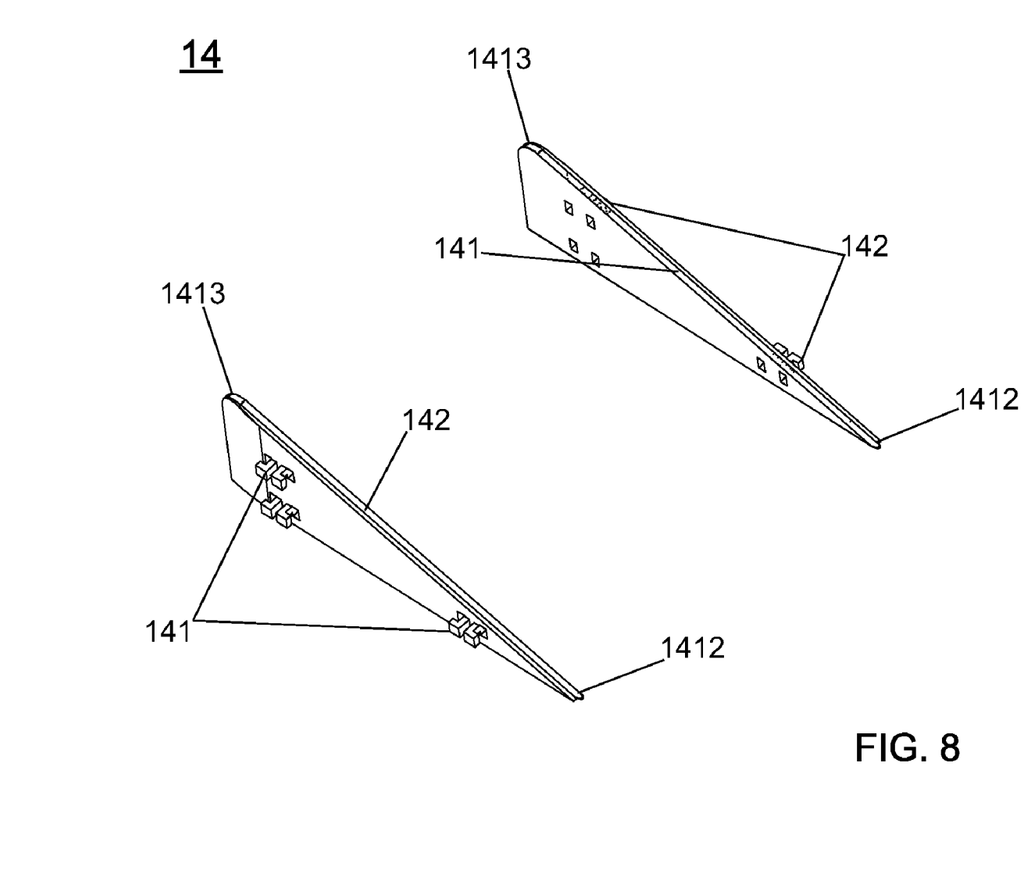
FIG. 8 is the stereo view of two disk feeding members of the improved automation disk feeding device according to the present invention.

Continuously referring to FIG. 8, which illustrates the stereo view of the two disk feeding members of the improved automation disk feeding device. In the improved automation disk feeding device 1, the two disk feeding members 14 are disposed on the second internal side-wall 117 and the third internal side-wall 118 of the base 11, respectively, wherein the second internal side-wall 117 is opposite to the third internal side-wall 118, and both the second internal side-wall 117 and the third internal side-wall 118 are adjacent to the first internal side-wall 115; Moreover, each of the disk feeding members 14 has a sliding way 141 formed on the top surface thereof, and an ending end 1412 of the sliding way 141 locates at the disk feeding opening 119. As shown in FIG. 5 and FIG. 8, each of the disk feeding members 14 further includes two assembling sets 142, formed on the side wall thereof; so that, by way of assembling the two assembling sets 142 with the two assembling slots 11E, the disk feeding member 14 is attached to the internal side-wall of the base 11.

Please refer to FIG. 4 and FIG. 5 again, in the improved automation disk feeding device 1, the cover 13 is secured on the base 11 by way of covering the pushing 12, and has a third opening 131 in the center thereof; Besides, an annular flange 132 is disposed around the third opening 131, and the third opening 131 and the annular flange 132 constitute of a disk storing district adopted for storing a plurality of disks 3. Moreover, as shown in FIG. 4 and FIG. 5, the third opening 131 is opposite to the second opening 121 when the cover 13 is secured on the base 11. The cover 13 further includes: a plurality of insertion holes 13, formed on the 132 for inserting a plurality of guiding pillars, respectively; and two first sensors 134, oppositely disposed on the annular flange 132 and used for detecting the remaining numbers of the disks 3 stored in the disk storing district.

Figure 9:
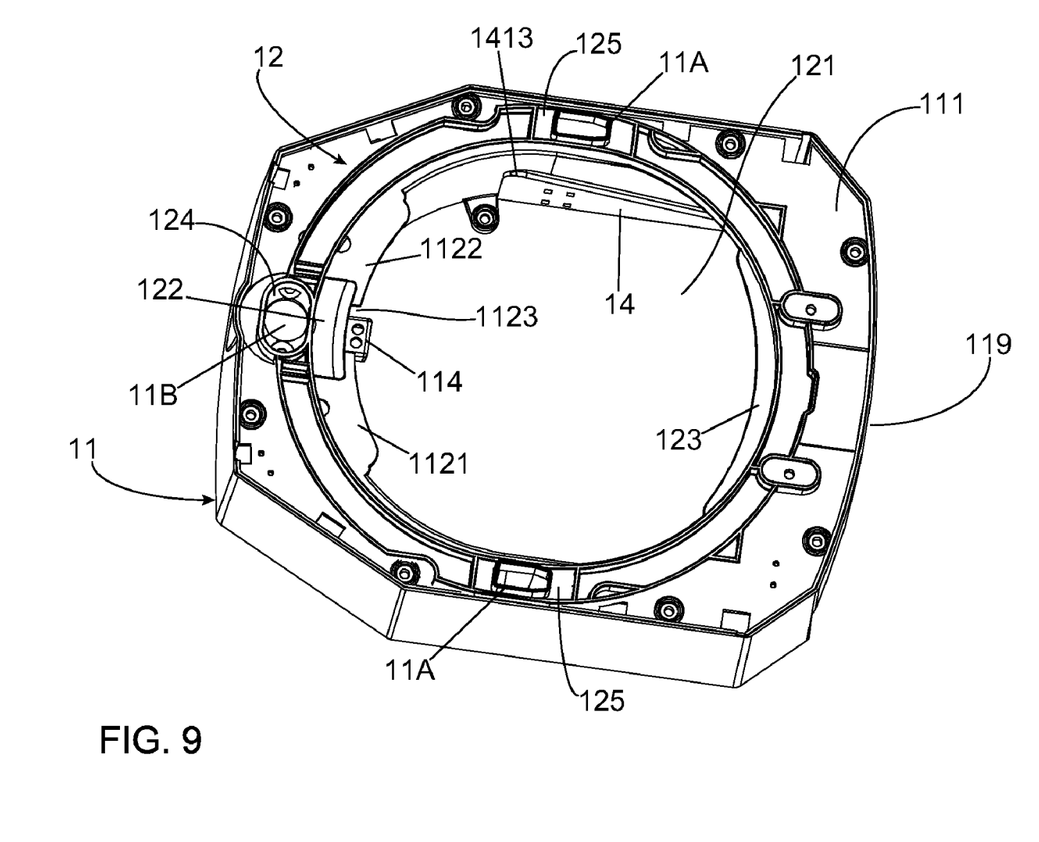
FIG. 9 and FIG. 10 are schematic motion diagrams of the pushing member sliding on an operation space of the base.

In the improved automation disk feeding device 1, the disks 3 stored in the disk storing district can be feeding out one by one by using the driving device 2 to drive the pushing member 12 to slide forth and back repeatedly on the operation space 111. So that, for more clearly describing how the improved automation disk feeding device 1 of the present invention feeds out the disks 3 stored in the disk storing district one by one, the motion diagrams of the pushing member 12 sliding on an operation space 11 are illustrated. Please refer to FIG. 9 and FIG. 10, which illustrate two schematic motion diagrams of the pushing member sliding on an operation space of the base. As shown in FIG. 9, when the pushing member 12 is disposed on the operation space 111, the second pushing portion 123 is covered the second indentation portion 1124 and the rolling member 113 formed on the operation space 111, but the first indentation portion 1123 on the operation space 111 is not covered by the first pushing portion 122.

Figure 10:
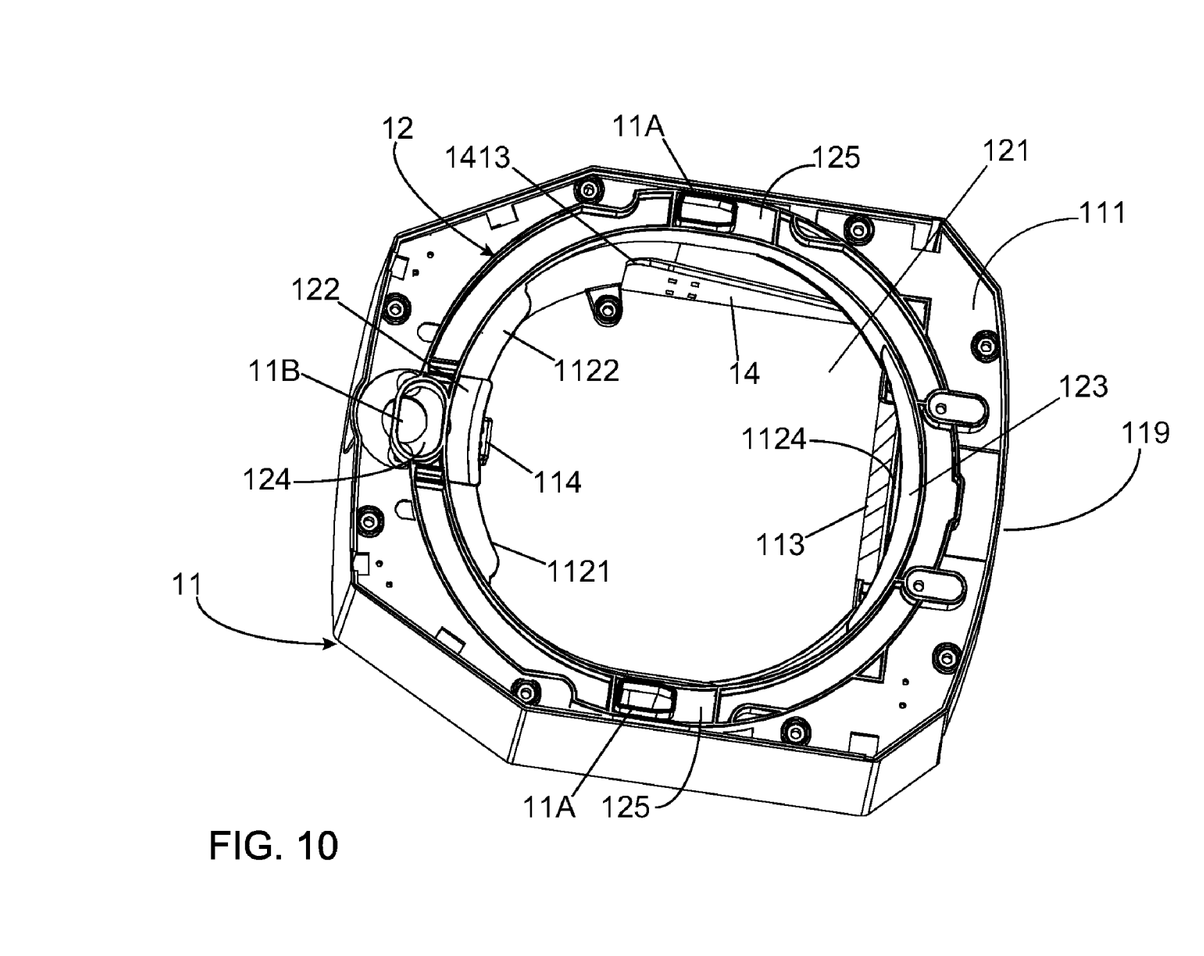
Figure 11:
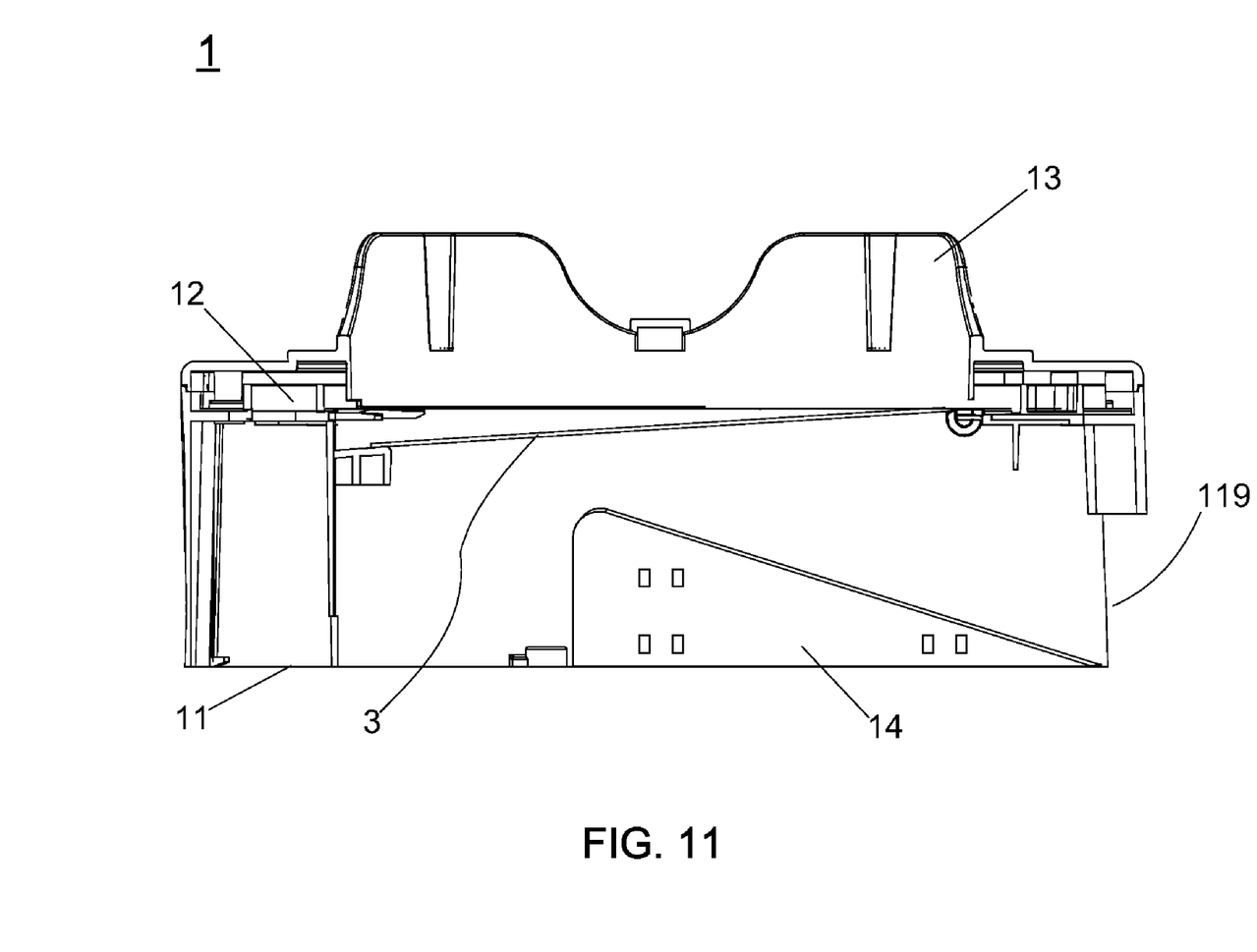
FIG. 11 and FIG. 12 are side section view of the improved automation disk feeding device according to the present invention.

Continuously referring to FIG. 10, and simultaneously referring to FIG. 11, which illustrates a side section view of the improved automation disk feeding device according to the present invention. As shown in FIG. 10 and FIG. 11, when the driving device 2 starts to operates and completes a half-cycle rotation, the eccentric member 11C finishes a half-circle rotation (the eccentric member 11C not shown in FIG. 9 and FIG. 10), such that the pushing member 12 slides toward the disk feeding opening 119, and the rolling member 113 and the second indentation portion 1124 are exposed out of the second pushing portion 123, but the first indentation portion 1123 is covered by the first pushing portion 122; meanwhile, a clipping groove is formed between the second indentation portion 1124 and the bottom of the cover 13, and one end of a disk 3 in the disk storing district is embedded into the clipping groove due to the pushing of the first pushing portion 122 and the rolling of the rolling member 113; besides, the another end of the disk 3 falls onto the supporting member 114 disposed on the first internal side-wall 115, so that the disk 3 is in a tilt state.

Figure 12:
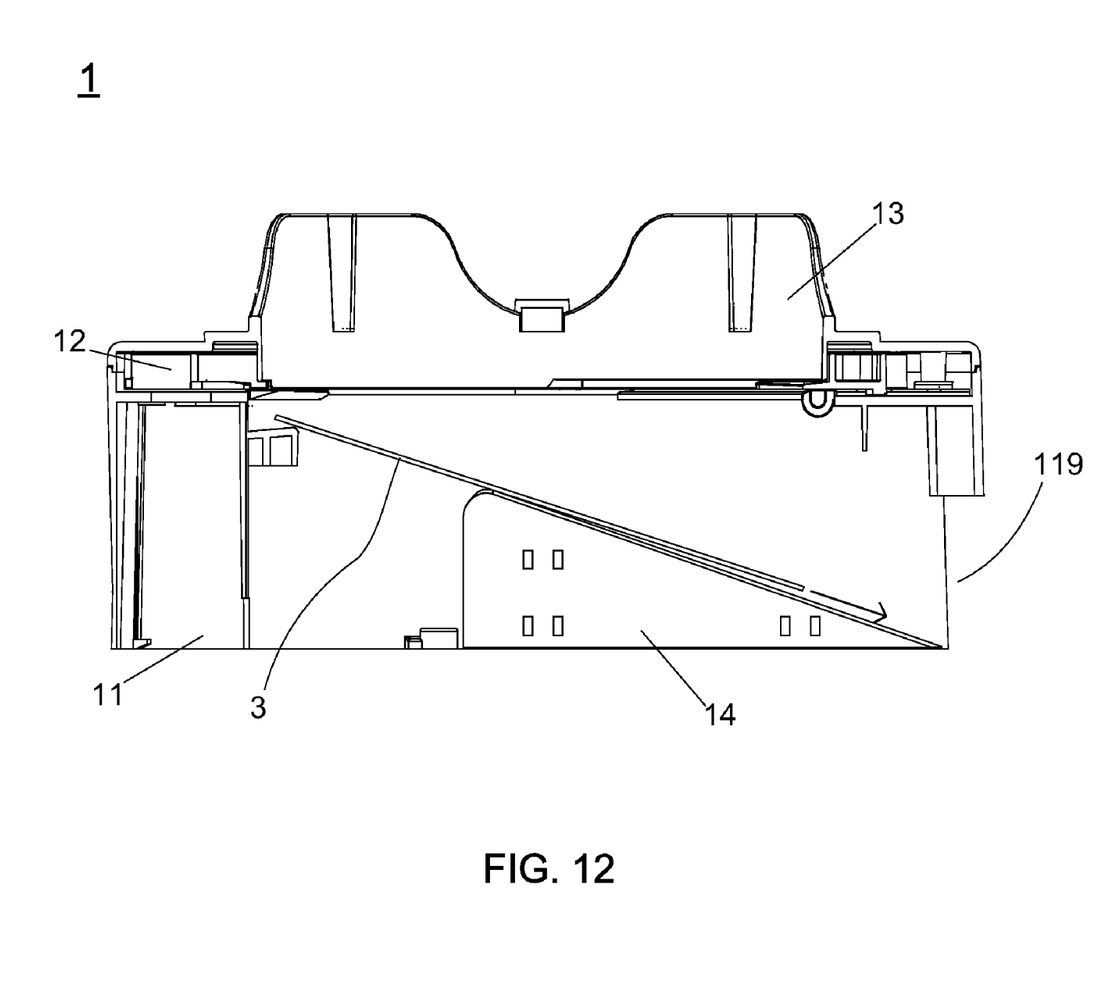

Continuously referring to FIG. 9, and simultaneously referring to FIG. 12, which also illustrates the side section view of the improved automation disk feeding device according to the present invention. When the driving device 2 operates continuously and finishes a full-cycle rotation, the eccentric member 11C completes a full-circle rotation; so that, as shown in FIG. 9 and FIG. 12, the pushing member 12 slides toward the first indentation portion 1123, such that the second pushing portion 123 covers the second indentation portion 1124 and the rolling member 113, and the first indentation portion 1123 is exposed out of the first pushing portion 122; in the meantime, the disk 3 quits the clipping groove and falls onto the two disk feeding members 14 due to the pushing of the second pushing portion 123, then the disk 3 slides along the sliding ways 141 of the disk feeding members 14 to the disk feeding opening 119. Moreover, after the disk 3 falls to the two feeding members 14, a second sensor disposed on the supporting member 114 automatically executes a count;

Thus, by the automatically counting of the second sensor, it is able to know the numbers of the disks fed out via the disk feeding opening 119.

Figure 13:
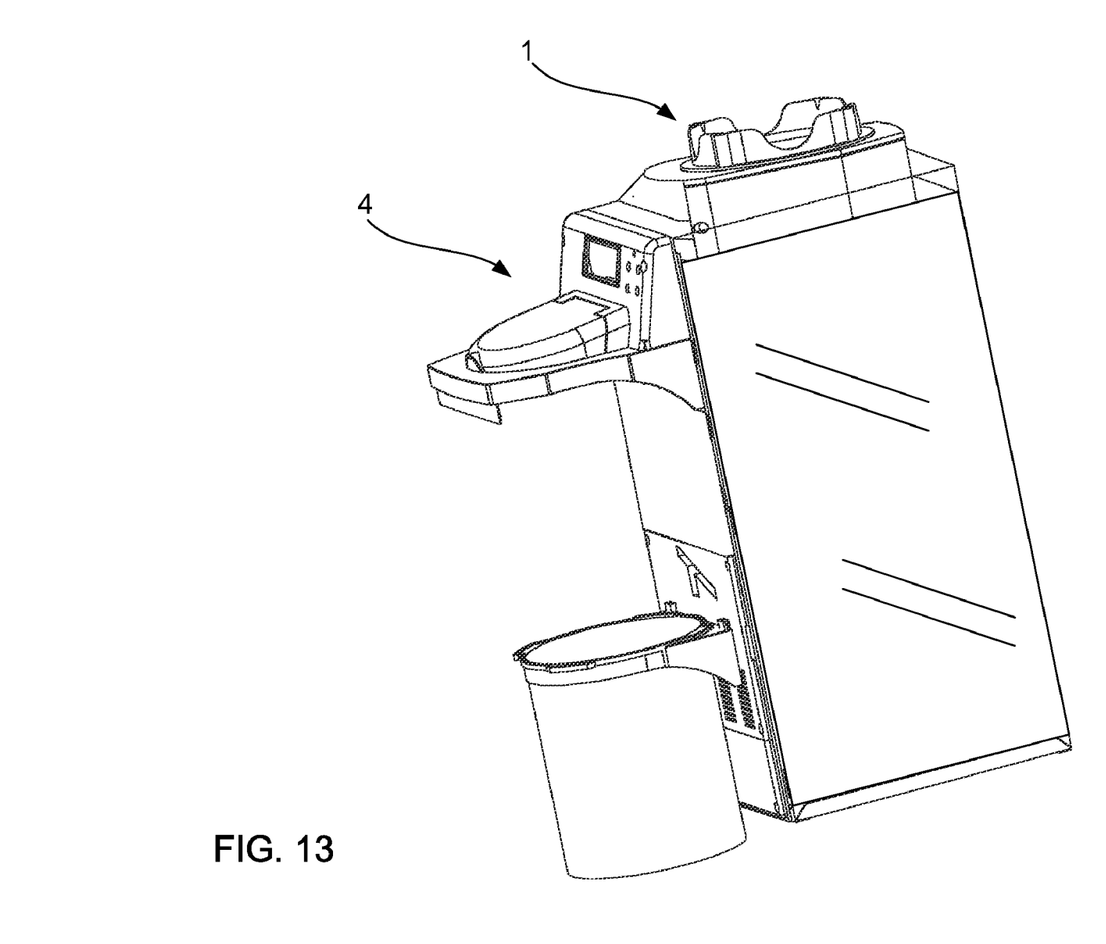
FIG. 13 is a perspective view illustrating an exemplary automation disk burning system having an improved automation disk feeding device in accordance with one embodiment of the present invention.

Thus, through above descriptions, the main constituting elements and the functionalities of the improved automation disk feeding device have been disclosed. However, as shown in FIG. 5 and FIG. 8, what must be additionally describe is that the sliding way 141 further includes a starting end 1413, wherein the relative height of the starting end 1413 is higher than the relative height of the ending end 1412; so that, when the disk falls on the slide way 141, the disk can slide toward the ending end 1412, and eventually slides to the disk feeding opening 119. Moreover, the slide way 141 of the disk feeding member 14 can be a wave-shaped slide way, an arc-shaped slide way, a curved slide way, and a linear slide way. By way of changing the shape of the slide ways 141 of the disk feeding members 14, the sliding speed of the disk is changed when the disk slides on the slide ways 141 of the disk feeding members 14. So that, the identical automation disk feeding device may has different applications by means of assembling the disk feeding members 14 with different shapes to the internal side-walls of the base 11, for example:

Please refer to FIG. 13, which illustrates an automation disk burning system having one improved automation disk feeding device; as shown in FIG. 13, after assembling two disk feeding members 14 with the linear slide ways 141, the improved automation disk feeding device 1 can be equipped to an automation disk burning system 4; therefore, when a disk tray withdraws from an optical disk device of the automation disk burning system 4, the improved automation disk feeding device 1 is able to automatically feed one disk stored in the disk storing district into the disk tray.

After assembling two disk feeding members 14 with the wave-shaped slide ways 141, the improved automation disk feeding device can be purely used as one disk storing device liking a pudding barrel; Thus, when the user would like to take the disks in the disk storing device, the user is able to operates the driving device 2 to drive the pushing member 12 to move, so as to make the disk stored in the disk storing district slides toward the disk feeding opening 119; moreover, when the disk slides to the disk feeding opening 119, the disk would stay at the disk feeding opening 119 due to the specific design of the wave-shaped slide ways 141 of the disk feeding members 14; so that, it facilitates the user to take the disks when using the improved automation disk feeding device as the disk storing device.

Thus, through the above descriptions, the improved automation disk feeding device of the present invention has been disclosed completely and clearly in the above description. In summary, the present invention has the following advantages:

1. By way of disposing the supporting member on the internal side-wall of the base, when the one end of the disk is embedded into the clipping groove, the another end of the disk can be held by the supporting member; Therefore, when the automation disk feeding device executes the disk feeding process quickly and repeatedly, the disk will be held by the supporting member and not fall onto the disk feeding members even if the one end of the disk has been quitted from the clipping groove; so that, the disk feeding process may not be stopped and fail and the stability of the automation disk feeding device is increased.
2. The width of the clipping groove is greater than the thickness of one disk, but less than the thickness of two disks; such design is able to ensure that all of the commercial available disks can be embedded into the clipping groove, so as to avoid that the disk quits from the clipping groove when automation disk feeding device executes the disk feeding process.
3. The two disk feeding members and the base are not integrally formed, but can be assembled to and dissembled from the internal side-walls of the base; so that, the identical automation disk feeding device may has different applications by way of changing the disk feeding members with different shapes.
4. The cover includes the two first sensors used for detecting the numbers of the disks stored in the disk storing district, so that, when the remaining quantity of the disks in the disk storing district is not many, the first sensors are able to inform the user to resupply disks into the disk storing district.
5. The second sensor disposed on the supporting member can automatically count the numbers of the disks exported via the disk exporting hole; thus, when automation disk feeding device executes the disk feeding process, it not needs to count the numbers of the disks exported via the feeding opening by way of manpower.

The above description is made on embodiments of the present invention. However, the embodiments are not intended to limit scope of the present invention, and all equivalent implementations or alterations within the spirit of the present invention still fall within the scope of the present invention.

We claim:

1. An improved automation disk feeding device, comprising:
   a base, comprising:
      an operation space;
      a first opening, being formed on the surface of the operation space, and having a first protruding portion, a second protruding portion, a first indentation portion, and a second indentation portion, wherein the first protruding portion, the first indentation portion and the second protruding portion are connected with each other, and the second indentation portion being opposite to the first protruding portion, the first indentation portion and the second protruding portion;
      a rolling member, being disposed in the second indentation portion;
      a supporting member, being opposite to the first indentation portion and disposed on a first internal side-wall of the base; and
      a disk feeding opening, being opposite to the first internal side-wall and formed on one side of the base;
   a pushing member, being disposed on the operation space and capable of sliding on the operation space, comprising:
      a second opening, being opposite to the first opening;
      a first pushing portion, being formed in a first edge of the second opening; and
      a second pushing, being opposite to the first pushing portion and formed on a second edge of the second opening;
   two disk feeding members, being disposed on a second internal side-wall and a third internal side-wall of the base, respectively, wherein the second internal side-wall is opposite to the third internal side-wall, and both the second internal side-wall and the third internal side-wall being adjacent to the first internal side-wall, moreover, each of the disk feeding members having a sliding way formed on the top surface thereof, and an ending end of the sliding way locating at the disk feeding opening; and
   a cover, being secured on the base by way of covering the pushing, and having a third opening in the center thereof, wherein an annular flange is disposed around the third opening, in addition, the third opening and the annular flange constituting of a disk storing district;

wherein a driving device is disposed in the interior of the base and used for driving the pushing member to slide on the operation space; moreover, when the driving device completes a half-cycle rotation, the pushing member sliding toward the disk feeding opening, so that the rolling member and the second indentation portion are exposed out of the second pushing portion, meanwhile, a clipping groove being formed between the second indentation portion and the bottom of the cover, and one end of a disk in the disk storing district being embedded into the clipping groove due to the pushing of the first pushing portion and the rolling of the rolling member, in addition, the another end of the disk falling on the supporting member disposed on the first internal side-wall; furthermore, when the driving device operates continuously and finishes a full-cycle rotation, the pushing member sliding toward the first indentation portion and pushing the disk, such that the disk quits the clipping groove and falls onto the two disk feeding members, and then the disk slides along the sliding ways of the disk feeding members to the disk feeding opening.

2. The improved automation disk feeding device of claim 1, wherein the base further comprises:
two positioning blocks, being oppositely disposed on the operation space;
an eccentric member installing hole, being formed on the operation space and adjacent to the first indentation portion;
a plurality of threaded holes, being disposed on the edge of the operation space and adopted for securing the cover and the base; and
two assembling slots, being disposed on the second internal side-wall and the third internal side-wall, respectively, and used for assembling the two disk feeding members.

3. The improved automation disk feeding device of claim 2, further comprising an eccentric member, being installed on and pass through the eccentric member installing hole, so as to connect with the driving device disposed within the base.

4. The improved automation disk feeding device of claim 2, wherein the pushing member further comprises:
an eccentric hole, being formed on the first edge of the second hole and adjacent to the first pushing portion, the eccentric hole allowing the eccentric member to pass through when the pushing member is disposed on the operation space; and
two long positioning holes, being oppositely formed on a third edge and a fourth edge of the second hole, respectively, and used for cooperating with the two positioning blocks;

wherein when the pushing member slides on the operation space, by way of the cooperation of the two long positioning holes and the two positioning blocks, not only the pushing member being able to steadily slide on the operation space, but also the slide distance of the pushing member being confined.

5. The improved automation disk feeding device of claim 4, wherein the first edge is adjacent to the third edge and the fourth edge, moreover, the second edge being also adjacent to the third edge and the fourth edge.

6. The improved automation disk feeding device of claim 1, wherein the cover further comprises:
a plurality of insertion holes, being formed on the for inserting a plurality of guiding pillars, respectively; and
two first sensors, being oppositely disposed on the annular flange and used for detecting the remaining numbers of the disks stored in the disk storing district.

7. The improved automation disk feeding device of claim 2, wherein the disk feeding member further comprises two assembling sets, being formed on the side wall thereof, so that, by way of assembling the two assembling sets with the two assembling slots, the disk feeding member being attached to the internal side-wall of the base.

8. The improved automation disk feeding device of claim 1, wherein the slide way further comprises a starting end, and the relative height of the starting end being higher than the relative height of the ending end, so that, when the disk falls on the slide way, the disk being able to slide toward the ending end, and eventually sliding to the disk feeding opening.

9. The improved automation disk feeding device of claim 1, wherein the supporting member has a second sensor, used for automatically counting the numbers of the disks quitting the clipping groove and falling onto the disk feeding members.

10. The improved automation disk feeding device of claim 9, wherein the slide way is selected from the group consisting of: a wave-shaped slide way, an arc-shaped slide way, a curved slide way, and a linear slide way.

11. The improved automation disk feeding device of claim 1, wherein the width of the clipping groove is greater than the thickness of one disk, but less than the total thickness of two disks.

* * * * *